No. 858,015. PATENTED JUNE 25, 1907.
H. PATAUD.
WHEEL FELLY.
APPLICATION FILED MAR. 5, 1907.

2 SHEETS—SHEET 1.

WITNESSES. INVENTOR.
Henri Pataud
BY
ATTY

No. 858,015. PATENTED JUNE 25, 1907.
H. PATAUD.
WHEEL FELLY.
APPLICATION FILED MAR. 5, 1907.
2 SHEETS—SHEET 2.
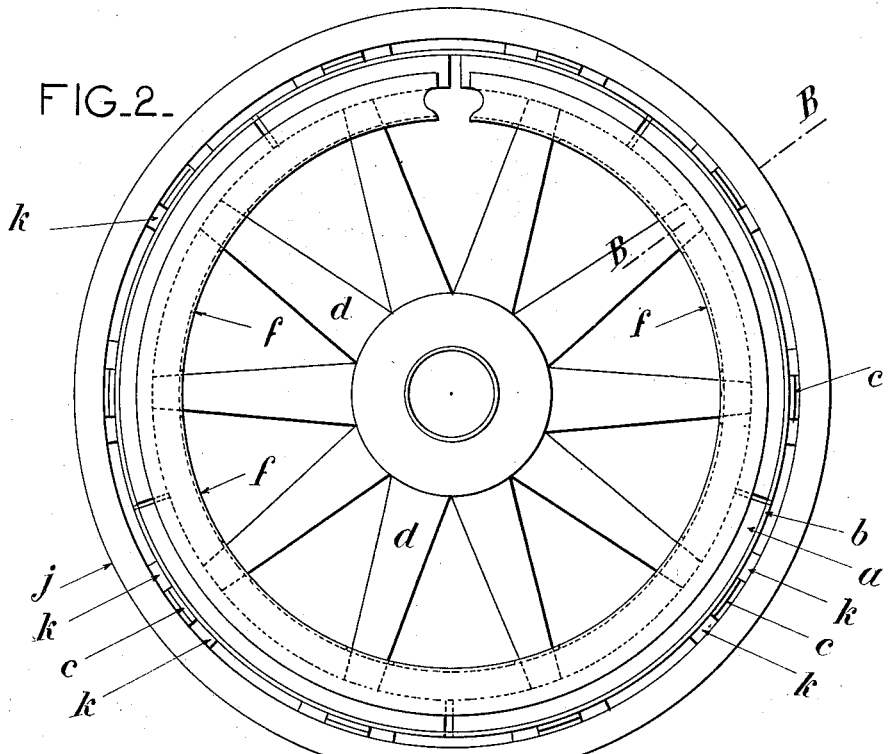
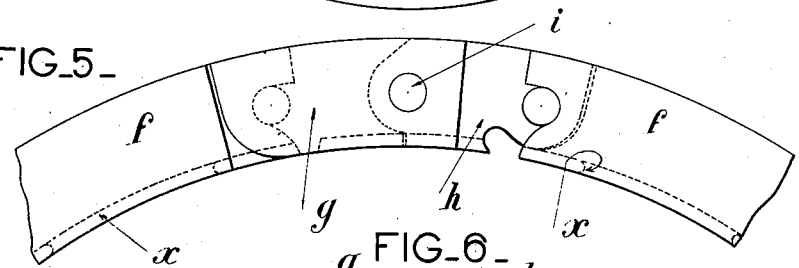
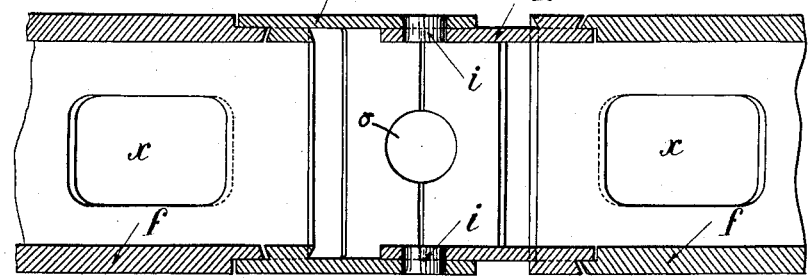
WITNESSES
Alvin G. White
W. P. Burke
INVENTOR
Henri Pataud
BY
ATTY

UNITED STATES PATENT OFFICE.

HENRI PATAUD, OF PARIS, FRANCE.

WHEEL-FELLY.

No. 858,015.  Specification of Letters Patent.  Patented June 25, 1907.

Application filed March 5, 1907. Serial No. 360,742.

*To all whom it may concern:*

Be it known that I, HENRI PATAUD, a citizen of France, residing at 15 Rue de la Fédération, Paris, France, have invented new and useful Improvements in Wheel-Fellies, of which the following is a specification.

This invention has for its principal object an arrangement which permits of providing at will two circular edges or flanges combined with a flat felly, or of removing these flanges, the said arrangement consisting essentially in a second felly of U-section with flanged edges, which is always engaged by the spokes of the wheel, and which, being open and elastic, assumes a position concentric with the flat felly and in position for dismounting, and on the other hand exactly fits this flat felly and projects at its outer edges when expanded, so as to lock and to maintain the tire in place.

The annexed drawing shows, by way of example, a wheel according to the invention.

Figure 1:
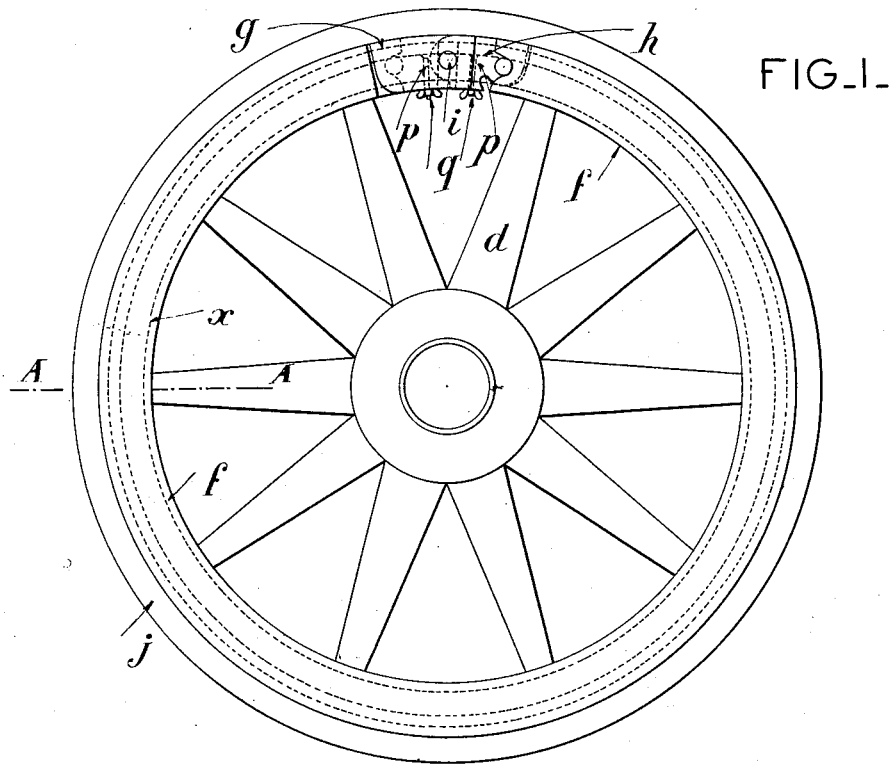
Figures 3, 4:
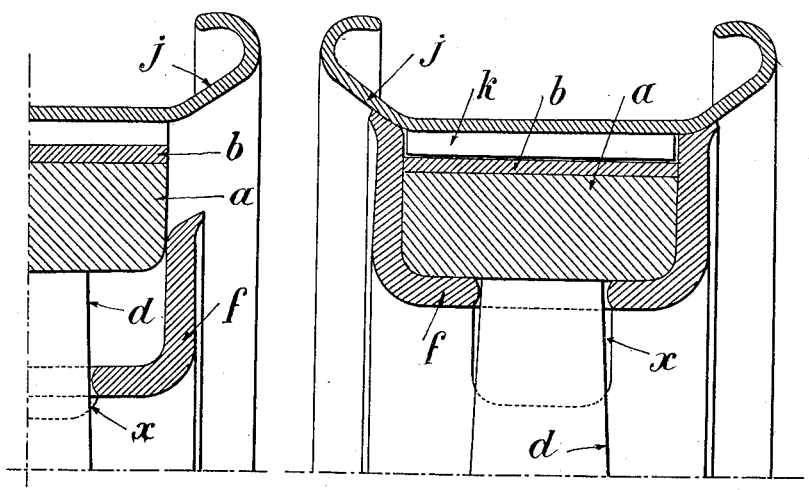

Figure 1 is an outside elevation of the wheel with the felly locked. Fig. 2 is an outside elevation of the wheel with the felly unlocked, and the locking connection released. Fig. 3 is a section to a larger scale of the wheel following the line A—A of Fig. 1. Fig. 4 is a half-section to a larger scale of the felly, following the line B—B of Fig. 3. Figs. 5 and 6 are an elevation and a circular section respectively, showing an embodiment of the locking joint and the second or profiled felly.

The periphery of the wooden wheel felly *a* receives an iron hoop *b*, secured when hot in the usual manner.

On the outer face of the wheel the periphery of the wooden felly and the iron hoop are notched substantially midway across for permitting the entry of the members for mounting an ordinary pneumatic tire on an ordinary rim, that is to say, the inflation valve and the stems of the securing bolts, which members project into the interior of the ordinary felly.

On the hoop are fixed, at intervals between the notches, small plates *c* of metal a few millimeters in thickness, whose outer surface is concentric with the hoop.

Before securing the periphery of the wooden felly *a* to the spokes *d*, there is engaged on the free ends of the latter an open steel ring *f*, of U-section; the cylindrical surface of the U has perforations *x*, which are as wide as the thickness of the spokes, but which are elongated in circumferential directions.

The circumference of the profiled ring, or second rim *f*, is smaller than the circumference of the wooden felly, so that to fit this ring *f* to the spokes it is sufficient to separate its two extremities so that it forms a circle at least equal to that described through the free extremities of the spokes. If in this position the perforations are made to register with the ends of the spokes, and the second rim is now let go it contracts, being penetrated by the spokes. There is then secured the rim of the wooden felly which is fastened while the steel is hot. The profiled ring *f* being open and its circumference being smaller than that of the wooden felly it will be understood that if the two ends are separated it increases in diameter until the outer surface of its cylindrical part fits against the inner surface of the periphery of the wooden felly. If in these conditions the tension separating these two ends is sufficient this profiled ring will bear on all the periphery of the wooden felly in the interior thereof and will form with it a rigid whole or unit. This increase of the diameter of the profiled ring may be obtained by any means whatever. In the example shown in the drawing it is obtained instantaneously and automatically by the following means:—Imagine the profiled ring fitting the entire inner surface of the wooden felly, and suppose that its length be such that its two extremities are separated by a distance of 100 millimeters for example, measured along the circumference and situated midway between two spokes. Take two elements or pieces, *g* and *h*, of the same profile with a length of 50 millimeters each and attached one to the other by a rigid member *i*, while the other two ends are of such form that they may be jointed to the two ends of the profiled ring.

If one supposes the ring to be distended and the articulated elements to be placed at its two ends it will be seen that on exercising pressure on the joint of the two elements, directed toward the circumference of the wheel, the angle formed by the two elements increases at the same time as the two extremities of the ring are separated. During this time the effort which it is necessary to exert increases and will be at the maximum at the moment when the three junctions are in alinement, and since the dead center will be passed the tendency of the profiled ring to close itself acts to lock the whole (profiled ring $f$ and elements $g$ and $h$) against the inner circumference of the wooden felly. In these conditions it will be understood that the sole means of loosening this connection is by directly exercising on the junction of these two elements an effort directed toward the center sufficient to pass the dead center. As soon as the dead center is passed the profiled ring immediately resumes its natural circumference: but on the contrary any circumferential effort exerted on the profiled ring will not tend to lock the whole system. Care must be taken in fitting the profiled ring to the spokes that the notch provided for the valve in the wooden felly is midway between two extremities of the profiled ring. The result is that during the increase or decrease of the diameter of the profiled ring the circumferential displacements between the wooden felly and the profiled ring are at the maximum at the position of the notch for the valve, and are zero at the other end of the diameter passing through the notch for the valve. Consequently the perforations $x$ for the play of the profiled ring on the spokes will be the most elongated for the two spokes situated on both sides of the notch for the valve, and on the contrary will be almost round for the two opposite spokes. The ovalization of the perforations for the intermediate spokes is calculated from the two end ovalizations.

The form of the profiled ring $f$ is such that when its cylindrical surface bears exactly on the inner surface of the wooden felly, its two cheeks or flanges and the connection with the cylindrical surface exactly fitting the shape of the wooden felly; the latter is thus not only contacted internally by the cylindrical surface of the profiled ring, but is entirely sunk in the said ring (see Fig. 3), which makes it rigid and thus restores to it the solidity lost by the notches formed in its breadth. As the two connected elements ($g$ and $h$) are only pieces of the same profiled member conveniently arranged for the play of the joint, it results that when the whole of the profiled ring and the elements are in locking position the whole of the wooden felly is fitted in the U-ring, which does not present in appearance any breach of continuity.

The cheeks or flanges of the U-shaped ring are higher by several millimeters than the thickness of the wooden felly together with that of the hoop and the circumference of the profiled ring, and also the size of the perforations in its cylindrical surface are such that when the profiled ring is left free to assume again its small diameter, the circumference of the end of the cheeks becomes smaller than the outer circumference of the hoop, clearing not only the whole circumference of the hoop, but also by a sufficient amount the notches provided for the fastening bolts; further, in this position, the two jointed elements, either when they have been completely removed as in Fig. 4, or when they form a V whose point is toward the center of the wheel entirely clear the notch provided for the valve.

If now it is imagined that in the interior of an ordinary felly $j$ there have been fixed some small metal plates $k$, concentric with the felly and of a height equal to the small plates $c$ attached to the hoop of the wooden felly, the device being combined so that the ordinary felly may be entered with easy friction in the hoop of the wooden wheel, two plates of the ordinary felly coming on both sides of one plate of the hoop, taking care to present the valve and the bolt stems in front of their respective castings; if the pneumatic tire is mounted on the felly it will suffice to constitute a rigid whole for locking the profiled ring against the wooden felly. In this position, indeed, the flanges of the profiled ring are presented on both sides of the inclined faces of the ordinary felly; they meet likewise before the profiled ring is entirely at the locking position, so that it is necessary in order that this locking position may be attained that it produce a slight elastic deformation of the ordinary felly and of the cheeks of the profiled ring which insures the desired solidity for the whole arrangement. The ordinary felly may in fact take its support partly directly from the wheel by resting on the hoop, partly from the U-shaped ring by pressing on the cheeks, the U-shaped ring being entirely solid with the wooden felly, since its cylindrical part, as has been said, bears over all its circumference on the inner face of the wooden felly.

If the wheel is supposed to be mounted on a carriage and the carriage is in movement, the reactions sustained by the felly are multiplied, but are always of two types: vertical reactions and horizontal reactions; and both kinds produce on the profiled ring a circumferential effort tending to diminish the diameter, which has as a result—thanks to the articulated arrangement employed—the accentuation of the locking effect against the wooden felly. The articulated arrangement may be designed in several ways, notably with or without an axis. The articulation with an axis has this advantage, that in the unlocked position both the elements are suspended at the ends of the profiled ring, taking the form of a V, but, on the other hand, the locking efforts and the reaction of the road will be carried on these axes. The annexed drawing shows an articulated whole without an axis, which comes completely out of the unlocking position and offers absolute security.

The work of removing the ordinary felly with its pneumatic tire, and its replacement by another like ordinary felly provided with a pneumatic tire, is done instantaneously in the following manner:—With a suitable lever, supported either on the end of the hub, or between two spokes, or on one spoke even, preferably, on the flange or the edge of the ordinary felly, a powerful pull is given toward the center under the middle joint of the two articulated elements $g$ and $h$. The profiled ring immediately assumes its small diameter, while the two articulated elements remain fixed to the end of the lever, acting as a gripper; the felly is withdrawn, replaced by another, and again given a blow from the lever, under the two elements of which the two rounded heads of the two heads have been engaged in the sockets at the ends of the profiled ring. For the sake of safety, the bottoms of the two articulated elements, which already form by their juxtaposition end to end a hole $o$ for the passage of the valve, are each pierced with a hole of small diameter, which is placed in the position of locking opposite a pin $p$ (see Fig. 1) fixed in the wooden felly, and whose length, which projects beyond the felly, is sufficient to enable to be placed below the articulated elements, either a nut $q$ or a thumb-screw.

The wheel provided with the arrangement of dismountable felly, which has been described, has the appearance of an ordinary wheel with a fixed felly. As further advantages it is expedient to point out the consolidation of the wooden felly which permits of notching it without danger of splitting. The felly, provided with its pneumatic tire, is fixed on the whole circumference and its removal as also its replacement are instantaneous.

Instead of employing a symmetrically profiled U-shaped ring whose two cheeks hold the felly when in the locking position, there may be employed an asymmetrical U-shaped profiled ring, whose cheek at the outer side of the carriage will resemble the cheeks of the symmetrically profiled ring, but whose inner cheek will not be so high and will stop for example in the locking position, on a level with the hoop of the wooden felly, and, which, instead of being constituted simply by a flat iron ring, will have on the interior on all its circumference an inclined edge, against which the high cheek of the profiled ring will press the felly when in its locking position.

The arrangement of the profiled ring with edges as above described may be also employed for the mounting of solid rubber tires. Indeed, given a solid tire armored in its interior or its circumference in any manner whatever, with a view to greater rigidity and less weakness, the extensible profiled ring permits of immediately forming two circumferential edges or flanges on the whole circumference of the flat felly, on which the tire has been mounted. The form of the cheeks will further permit of giving to the rubber a certain locking engagement on the same when they occupy their higher position when the profiled ring is locked on the wooden felly; likewise in unlocking the profiled ring the circular flanges disappear, and the easy removal of the tire can be effected.

It is understood that the device is applicable to all tires, those which are composed of elastic materials, homogeneous or heterogenous, or also by any mechanical devices whatever. It is equally applicable, as has been said, to the formation of fellies for detachable pneumatic tires, constituted by a flat felly on which there is mounted the air-tube in its cover.

The two cheeks of the profiled ring shaped in the form of a hook as in an ordinary felly, are presented in front of the beads of the cover; or the flat felly will receive two ordinary half-fellies, both removable, or one of the two fitted hot, which the cheeks of the U-shaped ring maintain in locking position.

This application would permit in particular of providing bicycles and motor cycles with removable fellies, which is impossible with the usual systems of removable rims, which always comprise a metallic ring which must be removed, and which cannot be taken out of the bicycle fork; with the system described, on the contrary, the flanges are lowered without coming away.

Finally, it will be observed that the manipulating lever may carry two small articulated cranks intended to force the profiled ring to press against the felly. In this case there is placed between the two ends of the profiled ring, at the locking position, a segment of like profile, which would be exactly of the length necessary for closing the circle.

Having now described my invention, what I claim as new and desire to secure by Letters Patent is:

1. A device for removable fellies comprising in combination an ordinary wooden felly $a$ with an iron hoop $b$, an ordinary tire felly $j$ adapted to be inserted sidewise over the wooden felly, metal plates $c$ provided on the hoop $b$ of the wooden felly, metal plates $k$ provided on the tire felly $j$, registering with the plates $c$ of the wooden felly and adapted to prevent circumferential movement of one felly with relation to the other, an open elastic steel ring of U-section $f$ embracing the wooden felly and engaged by the spokes of the wheel, the circumference of said ring $f$ being smaller than that of the wooden felly, and operative means adapted to expand the elastic steel ring $f$ so as to lock and maintain the tire felly in place, substantially as described and for the purpose set forth.

2. A device for removable fellies comprising in combination an ordinary wooden felly, $a$ with an iron hoop $b$, an ordinary tire felly $j$ adapted to be inserted sidewise over the wooden felly, metal plates $c$ provided on the hoop $b$ of the wooden felly, metal plates $k$ provided on the tire felly $j$, registering with the plates $c$ of the wooden felly and adapted to prevent circumferential movement of one felly with relation to the other, an open elastic steel ring of U-section $f$ embracing the wooden felly and engaged by the spokes of the wheel, the circumference of said ring $f$ being smaller than that of the wooden felly, and two pieces $g$ and $h$ of the same profile as the ring $f$, attached one to the other by one of their ends by means of a rigid member $i$ and jointed by their other suitably shaped ends respectively to the free ends of the open elastic ring $f$, substantially as described and for the purpose set forth.

In testimony whereof I have signed my name to this specification in the presence of two subscribing witnesses.

HENRI PATAUD.

Witnesses:
ANTOINE LARVIN,
HERNANDO DE SOTO.